(12) United States Patent
Schultz et al.

(10) Patent No.: US 7,703,528 B2
(45) Date of Patent: Apr. 27, 2010

(54) REDUCING CO₂ EMISSIONS FROM OILFIELD DIESEL ENGINES

(75) Inventors: Roger Schultz, Ninnekah, OK (US); Lewis Norman, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 227 days.

(21) Appl. No.: 12/014,320

(22) Filed: Jan. 15, 2008

(65) Prior Publication Data
US 2009/0178387 A1    Jul. 16, 2009

(51) Int. Cl.
*E21B 36/00* (2006.01)
*E21B 43/00* (2006.01)

(52) U.S. Cl. .............. 166/302; 166/57; 166/75.12; 166/268; 166/305.1; 166/369; 123/27 GE

(58) Field of Classification Search .............. None
See application file for complete search history.

(56) References Cited

U.S. PATENT DOCUMENTS

| | | | | |
|---|---|---|---|---|
| 3,232,885 A | * | 2/1966 | Henke | 252/372 |
| 3,523,192 A | * | 8/1970 | Lang | 290/52 |
| 3,664,315 A | * | 5/1972 | Kramer | 123/445 |
| 3,845,196 A | * | 10/1974 | Rhoades | 423/576.8 |
| 4,202,169 A | * | 5/1980 | Acheson et al. | 60/39.12 |
| 4,325,432 A | * | 4/1982 | Henry | 166/245 |
| 4,535,728 A | * | 8/1985 | Batchelor | 123/27 GE |
| 5,370,097 A | | 12/1994 | Davis | |
| 5,656,136 A | * | 8/1997 | Gayaut et al. | 166/302 |
| 5,988,280 A | * | 11/1999 | Crawford et al. | 166/303 |
| 6,543,395 B2 | | 4/2003 | Green | |
| 6,561,157 B2 | | 5/2003 | Zur Loye et al. | |
| 6,684,849 B2 | | 2/2004 | Zur Loye et al. | |
| 6,702,011 B2 | * | 3/2004 | Crawford et al. | 166/77.2 |
| 7,019,626 B1 | | 3/2006 | Funk | |
| 7,299,868 B2 | * | 11/2007 | Zapadinski | 166/266 |
| 2004/0111210 A1 | | 6/2004 | Davis et al. | |
| 2007/0277982 A1 | * | 12/2007 | Shampine et al. | 166/308.1 |

FOREIGN PATENT DOCUMENTS

| | | |
|---|---|---|
| EP | 690957 | 1/1996 |
| EP | 1546532 | 6/2005 |
| WO | 02/101214 | 12/2002 |
| WO | 2004/029438 | 4/2004 |
| WO | 2006/096271 | 9/2006 |

* cited by examiner

*Primary Examiner*—George Suchfield
(74) *Attorney, Agent, or Firm*—John W. Wustenberg; Smith IP Services, PC

(57) ABSTRACT

A method of reducing $CO_2$ emission from a wellsite diesel engine includes the steps of: providing the wellsite diesel engine operatively coupled to a wellsite apparatus for transmission of power from the wellsite diesel engine to the wellsite apparatus; and injecting at least one component of natural gas into the wellsite diesel engine, thereby combusting the natural gas component in the wellsite diesel engine. A system for supplying power to a wellsite apparatus includes a wellsite diesel engine operatively coupled to the wellsite apparatus for transmission of power to the wellsite apparatus; a diesel fuel supply; a natural gas component fuel supply which supplies at least one component of natural gas; and each of the diesel and natural gas component fuel supplies being connected to the wellsite diesel engine for combustion therein of a mixture of diesel fuel and the natural gas component.

20 Claims, 3 Drawing Sheets

US 7,703,528 B2

REDUCING CO₂ EMISSIONS FROM OILFIELD DIESEL ENGINES

BACKGROUND

The present disclosure relates generally to equipment utilized and operations performed in conjunction with a subterranean well and, in an embodiment described herein, more particularly provides for reducing $CO_2$ emissions from oilfield diesel engines.

For environmental reasons, it is important to reduce the emission of greenhouse gases, such as carbon dioxide. Unfortunately, many types of oilfield equipment are operated by means of diesel engines, which typically produce a relatively large quantity of carbon dioxide in the process of combusting diesel fuel.

Therefore, it may be seen that it would be very beneficial to be able to reduce emissions of carbon dioxide from diesel engines used at wellsite locations to provide power to wellsite equipment.

SUMMARY

In the present specification, a method and system are provided which solve at least one problem in the art. One example is described below in which one or more natural gas components are combusted along with diesel fuel in a wellsite diesel engine. Another example is described below in which the natural gas component is supplied from a gas producing well at or near the wellsite.

In one aspect, a method of reducing $CO_2$ emission from a wellsite diesel engine is provided. The method includes the steps of: providing the wellsite diesel engine operatively coupled to a wellsite apparatus for transmission of power from the wellsite diesel engine to the wellsite apparatus; and injecting at least one component of natural gas into the wellsite diesel engine, thereby combusting the natural gas component in the wellsite diesel engine.

In another aspect, a system for supplying power to a wellsite apparatus is provided. The system includes a wellsite diesel engine operatively coupled to the wellsite apparatus for transmission of power to the wellsite apparatus, a diesel fuel supply and a natural gas component fuel supply which supplies at least one component of natural gas. Each of the diesel and natural gas component fuel supplies is connected to the wellsite diesel engine for combustion therein of a mixture of diesel fuel and the natural gas component.

These and other features, advantages, benefits and objects will become apparent to one of ordinary skill in the art upon careful consideration of the detailed description of representative embodiments hereinbelow and the accompanying drawings, in which similar elements are indicated in the various figures using the same reference numbers.

DETAILED DESCRIPTION

It is to be understood that the various embodiments of the present disclosure described herein may be utilized in various orientations, such as inclined, inverted, horizontal, vertical, etc., and in various configurations, without departing from the principles of the present disclosure. The embodiments are described merely as examples of useful applications of the principles of the disclosure, which is not limited to any specific details of these embodiments.

In the following description of the representative embodiments of the disclosure, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
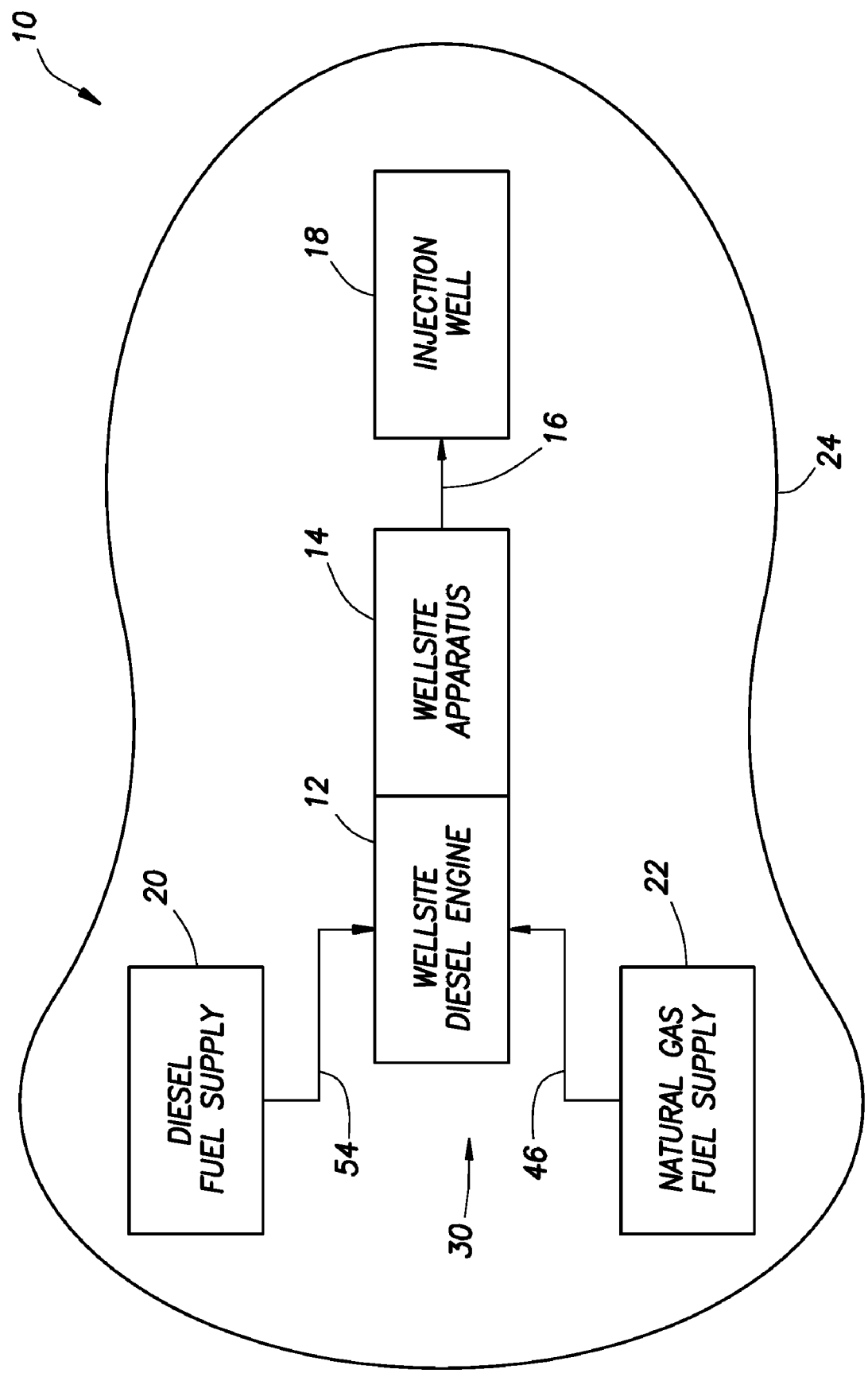
FIG. 1 is a schematic view of a well system embodying principles of the present invention.

Representatively illustrated in FIG. 1 is a well system 10 which embodies principles of the present disclosure. In the well system 10, a wellsite diesel engine 12 is used to provide power to a wellsite apparatus 14. The apparatus 14 may be any type of wellsite apparatus, such as a pump, blender, compressor, vehicle, electrical power generator, etc.

In the example of FIG. 1, the apparatus 14 is a pump used to inject fluid 16 into an injection well 18. The fluid 16 may be any type of fluid, such as stimulation fluid, treatment fluid, fracturing fluid, water, gas, oil, foam, gel, acid, proppant slurry, gravel slurry, etc. However, it should be clearly understood that it is not necessary in keeping with the principles of the present disclosure for the apparatus 14 to be a pump or for any fluid 16 to be pumped into any injection well 18.

The injection well 18 in the system 10 is not necessarily used for long term injection of the fluid 16. Instead, the fluid 16 may only be injected into the well 18 during a treatment or stimulation operation, and the well could later be used for production of fluids, such as hydrocarbon fluids, water, etc.

A diesel fuel supply 20 and a natural gas fuel supply 22 are connected to the diesel engine 12. Preferably, the diesel engine 12 combusts a mixture of diesel fuel 54 and at least one component 46 of natural gas 42 in order to supply power to the apparatus 14.

The natural gas fuel supply 22 may comprise another well which produces natural gas. In this manner, the fuel supply 22 is conveniently located in relatively close proximity to the diesel engine 12, apparatus 14 and injection well 18.

As depicted in FIG. 1, the diesel engine 12, apparatus 14, injection well 18 and natural gas fuel supply 22 are at a same location 24. The location may be a same oilfield, a same wellsite, overlying a same reservoir, etc.

However, it should be clearly understood that it is not necessary for the diesel engine 12, apparatus 14, injection well 18 and natural gas fuel supply 22 to be at the same location 24. For example, the natural gas fuel supply 22 could be at another location and delivered to the location 24 by pipeline, truck, etc.

The natural gas component 46 supplied to the diesel engine 12 could be propane, methane, butane or any other natural gas component or combination of components. "Raw" natural gas could be supplied to the diesel engine 12. As another alternative, compressed natural gas (CNG) or liquefied natural gas (LNG) could be supplied to the diesel engine 12.

Figure 2:
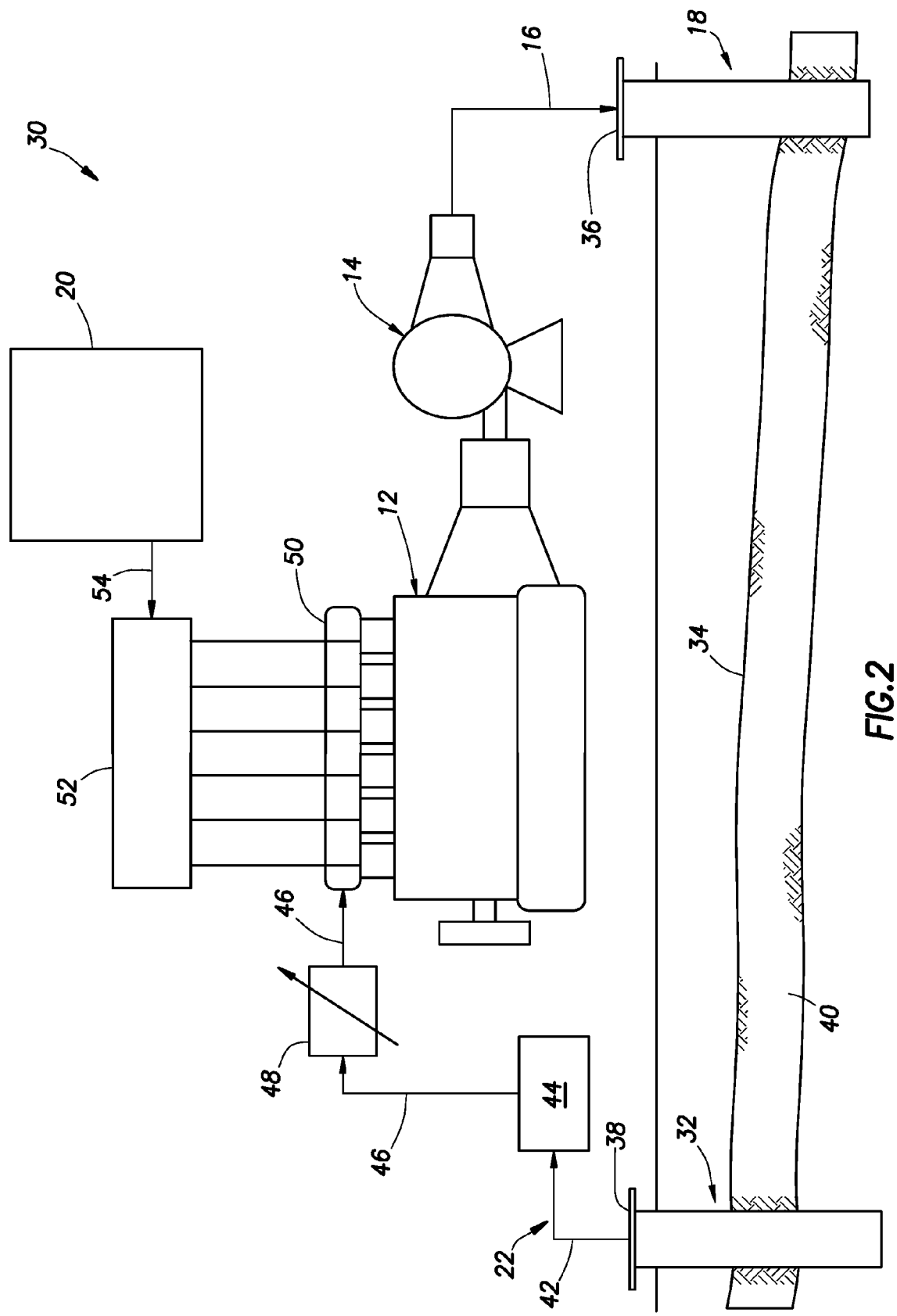
FIG. 2 is a schematic view of a system for supplying power to a wellsite apparatus, the system embodying principles of the invention.

Referring additionally now to FIG. 2, a schematic diagram of a system 30 for supplying power to the wellsite apparatus 14 is representatively illustrated. The power supply system 30 may be used in the well system 10 of FIG. 1, or it may be used in other well systems if desired.

In the example of FIG. 2, the natural gas fuel supply 22 comprises a gas producing well 32. The producing well 32 may intersect the same subterranean formation 34 as the injection well 18, but this is not necessary in keeping with the principles of the present disclosure. Instead, the wells 18, 32 could include respective wellheads 36, 38 which overlie the same formation 34 or hydrocarbon reservoir 40, the wells could be in the same oilfield, etc.

Natural gas 42 is delivered to a fuel gas conditioner 44 from the wellhead 38. The conditioner 44 provides at least one natural gas component 46 to a gas fuel valve 48 which controls injection of the natural gas component(s) into an intake manifold 50 of the diesel engine 12.

The diesel fuel 54 is delivered to the diesel engine 12 via a conventional diesel injection system 52, which typically includes a pump and injectors. Preferably, the gas fuel valve 48 is regulated so that up to approximately 75-80% of the fuel combusted by the diesel engine 12 is the natural gas component(s) 46. However, if the natural gas component 46 is not available at a particular wellsite, the diesel engine 12 can still be operated on diesel fuel 54 alone.

Figure 3:
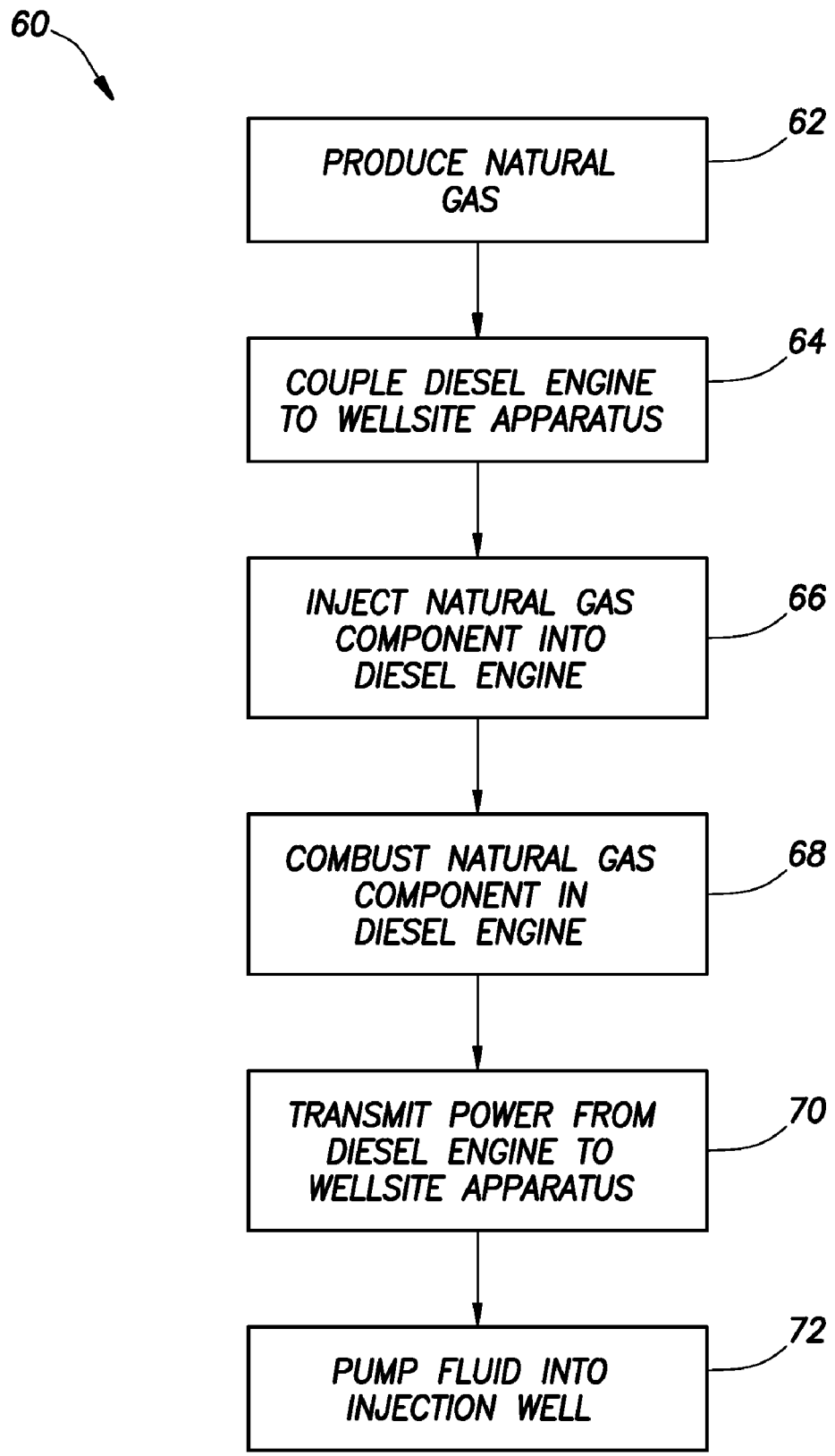
FIG. 3 is a schematic flowchart for a method of reducing $CO_2$ emission from a wellsite diesel engine, the method embodying principles of the invention.

Referring additionally now to FIG. 3, a method 60 of reducing $CO_2$ emission from the wellsite diesel engine 12 is schematically illustrated in flowchart form. This method 60 corresponds to the operations described above for the system 30, but the method may be used in other systems if desired.

In an initial step 62 of the method 60, natural gas 42 is produced. The natural gas 42 may be produced from a well 32 at a same location 24 as the diesel engine 12, for example, in a same oilfield, at a same wellsite, overlying the same formation 34 or reservoir 40, etc. Alternatively, the natural gas 42 may be produced at another location and delivered by pipeline, truck, etc. to the diesel engine 12.

In step 64, the diesel engine 12 is operatively coupled to the wellsite apparatus 14, so that power may be supplied from the diesel engine to the apparatus. This coupling may take place at any location, before or after the diesel engine 12 and/or apparatus 14 are delivered to the wellsite.

In step 66, the natural gas component(s) 46 is injected into the diesel engine 12. As described above, the natural gas component(s) 46 may be injected into the intake manifold 50, but other means of injecting the natural gas component(s) may be used if desired (for example, via the injection system 52, etc.).

In step 68, the natural gas component 46 is combusted in the diesel engine 12. This combustion is preferably a part of the diesel cycle, in which fuel is ignited by heat generated by compressing an air and fuel mixture. In the present case, the fuel is a mixture of diesel fuel 54 and one or more natural gas components 46. For prevention of pre-ignition, preferably the fuel mixture is up to approximately 75-80% of the natural gas component(s) 46.

In step 70, power is transmitted from the diesel engine 12 to the apparatus 14. The diesel engine 12 could be either directly or remotely coupled to the apparatus 14 for this power transmission.

In step 72, the fluid 16 is pumped by the apparatus 14 into the injection well 18. Of course, if the apparatus 14 is not a pump, then another function may be performed by the apparatus in response to transmission of power thereto from the diesel engine 12.

It should be understood that it is not necessary for the steps 62-72 to be performed in the order described above and depicted in FIG. 3. Instead, the steps 62-72 may be performed in any order, and more or less steps may be performed in the method 60, in keeping with the principles of the present disclosure.

It may now be fully appreciated that the above description of the well system 10, power supply system 30 and method 60 provides many advancements in the art of reducing carbon dioxide emissions. These advancements include utilizing natural gas 42 available at a wellsite as a fuel supply 22 for operation of a diesel engine 12, reducing the carbon dioxide emissions from the diesel engine due to combusting a mixture of diesel fuel 54 and natural gas component(s) 46, the ability to operate the diesel engine on only diesel fuel if the natural gas is not available, improvements in performance and longevity of the diesel engine due to use of natural gas components as a portion of its fuel, etc.

In particular, a method 60 of reducing $CO_2$ emission from a wellsite diesel engine 12 is described above. The method 60 includes the steps of: providing the wellsite diesel engine 12 operatively coupled to a wellsite apparatus 14 for transmission of power from the wellsite diesel engine to the wellsite apparatus; and injecting at least one component 46 of natural gas 42 into the wellsite diesel engine 12, thereby combusting the natural gas component in the wellsite diesel engine.

The natural gas component 46 may include propane, methane and/or butane in the injecting step. The injecting step may include injecting multiple natural gas components 46 into the wellsite diesel engine 12.

The method 60 may include the step 62 of producing the natural gas 42 from an oilfield, and the injecting step 66 may be performed at the oilfield. The method 60 may include the step 62 of producing the natural gas 42 from a reservoir 40 in a subterranean formation 34, and the injecting step 66 may be performed at a location 24 overlying the subterranean formation. The method 60 may include the steps 62, 72 of producing the natural gas 42 from a reservoir 40 in a subterranean formation 34 in the earth, and pumping fluid 16 into the earth using the wellsite apparatus 14 as a result of operating the wellsite diesel engine 12.

The method 60 may also include the step of operating the wellsite diesel engine 12 for transmission of power from the wellsite diesel engine to the wellsite apparatus 14 without injecting the natural gas component 46 into the diesel engine.

A system 30 for supplying power to a wellsite apparatus 14 is also described above. The system 30 may include a wellsite diesel engine 12 operatively coupled to the wellsite apparatus 14 for transmission of power to the wellsite apparatus, a diesel fuel supply 20, and a natural gas component fuel supply 22 which supplies at least one component 46 of natural gas 42. Each of the diesel and natural gas component fuel supplies 20, 22 may be connected to the wellsite diesel engine 12 for combustion therein of a mixture of diesel fuel 54 and the natural gas component 46.

The natural gas component fuel supply 22 may be connected to an intake manifold 50 of the wellsite diesel engine 12. The natural gas component fuel supply 22 may comprise a gas producing well 32.

The wellsite apparatus 14 may pump fluid 16 into an injection well 18 in response to transmission of power from the wellsite diesel engine 12 to the wellsite apparatus.

The gas producing well 32 and the injection well 18 may be disposed in a same oilfield. The gas producing well 32 and the injection well 18 may intersect a same subterranean formation 34. The wellheads 38, 36 of the gas producing and injection wells 32, 18 may overlie a same subterranean hydrocarbon reservoir 40.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method of reducing $CO_2$ emission from a wellsite diesel engine, the method comprising the steps of:
   injecting a mixture of diesel fuel and at least one component of natural gas into the wellsite diesel engine operatively coupled to a wellsite apparatus for transmission of power from the wellsite diesel engine to the wellsite apparatus; and
   the mixture combusting in the wellsite diesel engine, thereby combusting the natural gas component in the wellsite diesel engine and reducing the $CO_2$ emission from the wellsite diesel engine.

2. The method of claim 1, wherein the natural gas component comprises methane in the injecting step.

3. The method of claim 1, wherein the natural gas component comprises propane in the injecting step.

4. The method of claim 1, wherein the natural gas component comprises butane in the injecting step.

5. The method of claim 1, wherein the injecting step further comprises injecting multiple natural gas components into the wellsite diesel engine.

6. The method of claim 1, further comprising the step of producing the natural gas from an oilfield, and wherein the injecting step is performed at the oilfield.

7. The method of claim 1, further comprising the step of producing the natural gas from a reservoir in a subterranean formation, and wherein the injecting step is performed at a location overlying the subterranean formation.

8. The method of claim 1, further comprising the steps of producing the natural gas from a reservoir in a subterranean formation in the earth, and pumping fluid into the earth using the wellsite apparatus as a result of operating the wellsite diesel engine.

9. The method of claim 1, further comprising the step of operating the wellsite diesel engine for transmission of power from the wellsite diesel engine to the wellsite apparatus without injecting the natural gas component into the diesel engine.

10. A system for supplying power to a wellsite apparatus, the system comprising:
    a wellsite diesel engine operatively coupled to the wellsite apparatus for transmission of power to the wellsite apparatus;
    a diesel fuel supply which supplies diesel fuel;
    a natural gas component fuel supply which supplies at least one component of natural gas; and
    a gas fuel valve which regulates a mixture of the diesel fuel and the natural gas component supplied to the wellsite diesel engine, thereby preventing pre-ignition in the wellsite diesel engine.

11. The system of claim 10, wherein the natural gas component fuel supply is connected to an intake manifold of the wellsite diesel engine.

12. The system of claim 10, wherein the natural gas component fuel supply comprises a gas producing well.

13. The system of claim 12, wherein the wellsite apparatus pumps fluid into an injection well in response to transmission of power from the wellsite diesel engine to the wellsite apparatus.

14. The system of claim 13, wherein the gas producing well and the injection well are disposed in a same oilfield.

15. The system of claim 13, wherein the gas producing well and the injection well intersect a same subterranean formation.

16. The system of claim 13, wherein wellheads of the gas producing and injection wells overlie a same subterranean hydrocarbon reservoir.

17. The system of claim 10, wherein the natural gas component comprises propane.

18. The system of claim 10, wherein the natural gas component comprises methane.

19. The system of claim 10, wherein the natural gas component comprises butane.

20. The system of claim 10, wherein the wellsite diesel engine is operable by combustion of the diesel fuel without the natural gas component.

* * * * *